United States Patent
Adam et al.

[15] 3,687,319
[45] Aug. 29, 1972

[54] TRAILER FOR ERECTING AND TRANSPORTING STORAGE TANKS

[72] Inventors: Vernon F. Adam, R.R. #1, Wellman, Iowa 52356; Carl A. Vogel, 110 N. Chesnay, Keota, Iowa 52248

[22] Filed: Jan. 14, 1971

[21] Appl. No.: 106,379

[52] U.S. Cl. .................................214/501, 214/515
[51] Int. Cl. ..........................................B60p 1/16
[58] Field of Search..............214/501, 515, 380–383; 280/5 E, 5 F

[56] References Cited

UNITED STATES PATENTS

| | | | |
|---|---|---|---|
| 3,155,248 | 11/1964 | Haller | 214/501 X |
| 3,547,291 | 12/1970 | Batterton | 214/501 X |

*Primary Examiner*—Albert J. Makay
*Attorney*—Rudolph L. Lowell

[57] ABSTRACT

The tank handling trailer includes an elongated main frame connectible at its front end to a tractor and having a tank supporting mast pivotally supported at its rear end for movement from an upright tank erecting position to a horizontal forwardly extended transport position overlying about the rear half length of the main frame. A tank in picked up directly by the upright pivoted mast, and then moved to a horizontal position wherein it is supported on the mast and main frame for transport to an erection location. The tank is erected by simply moving the pivoted mast from the horizontal transport position to the upright tank erecting position therefor.

6 Claims, 10 Drawing Figures

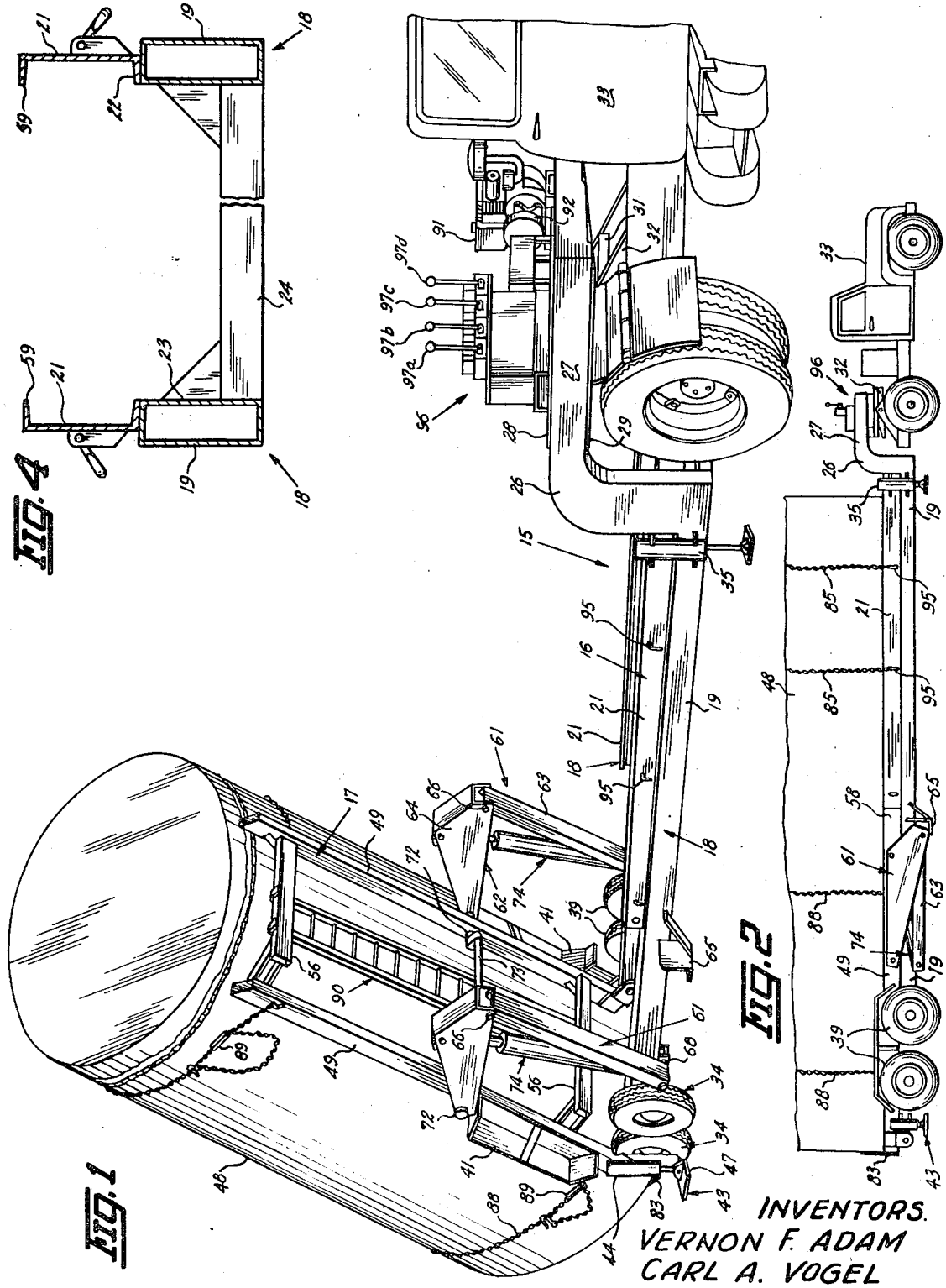

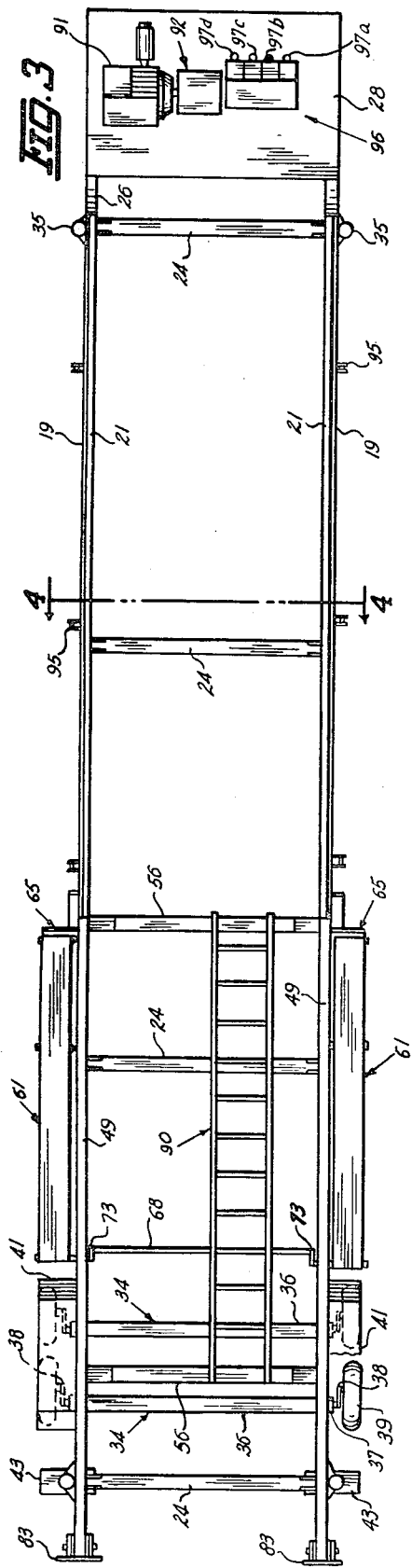

INVENTORS.
VERNON F. ADAM
CARL A. VOGEL
BY Rudolph L. Lovell.
ATTORNEY.

TRAILER FOR ERECTING AND TRANSPORTING STORAGE TANKS

SUMMARY OF THE INVENTION

The tank handling trailer of this invention is of a simple and rugged construction and efficient in operation to handle a single large tank of about a 25,000 gallon capacity, or a pair of 12,000 gallon tanks, for transport and erection purposes. In its transport position the pivoted tank-carrying mast is in longitudinal alignment with cooperating side frame members that form part of the trailer main frame so as to provide a continuous bearing support for the tank over the full length of the tank. Leg extensions for the lower end of the tank-carrying mast, when in a tank pick-up operation, are adjustable to ground engaging positions for insertion of foot portions thereon into engagement with the underside of the tank. This is accomplished by merely backing the trailer until the mast is against a side of the tank. With the tank then secured to the mast by chains or the like, the tank is directly movable on the mast to a transport position. In an erecting operation the main frame is stabilized against lateral and longitudinal movements and is vertically adjustable relative to an inclined ground surface to provide for the positioning of the upright mast substantially normal to the ground surface on which the tank is to be erected. The operation of the tank handling trailer is controlled from a single control station located at the front end of the trailer so that the overall operation is directly observable by the trailer operator.

BRIEF DESCRIPTION OF THE DRAWINGS

FIG. 1 is a front perspective view of the tank handling trailer of this invention shown in assembly relation with a tractor vehicle and illustrating the tank-carrying frame in an intermediate moved position;

FIG. 2 is a reduced side elevation of the assembly illustrated in FIG. 1 showing the tank-carrying frame in a transport position;

FIG. 3 is a plan view of the trailer in FIG. 1 showing the tank-carrying frame in a horizontally extended transport position;

FIG. 4 is an enlarged sectional detail view taken along the line 4 — 4 in FIG. 3;

FIG. 5 is an enlarged perspective view of the rear portion of the trailer shown in FIG. 3;

FIG. 6 is a detail sectional view on the line 6 — 6 in FIG. 5;

FIG. 9 is an elevational detail view showing a tank supporting leg that forms part of the tank-carrying frame.

DETAILED DESCRIPTION OF THE INVENTION

Figure 7:
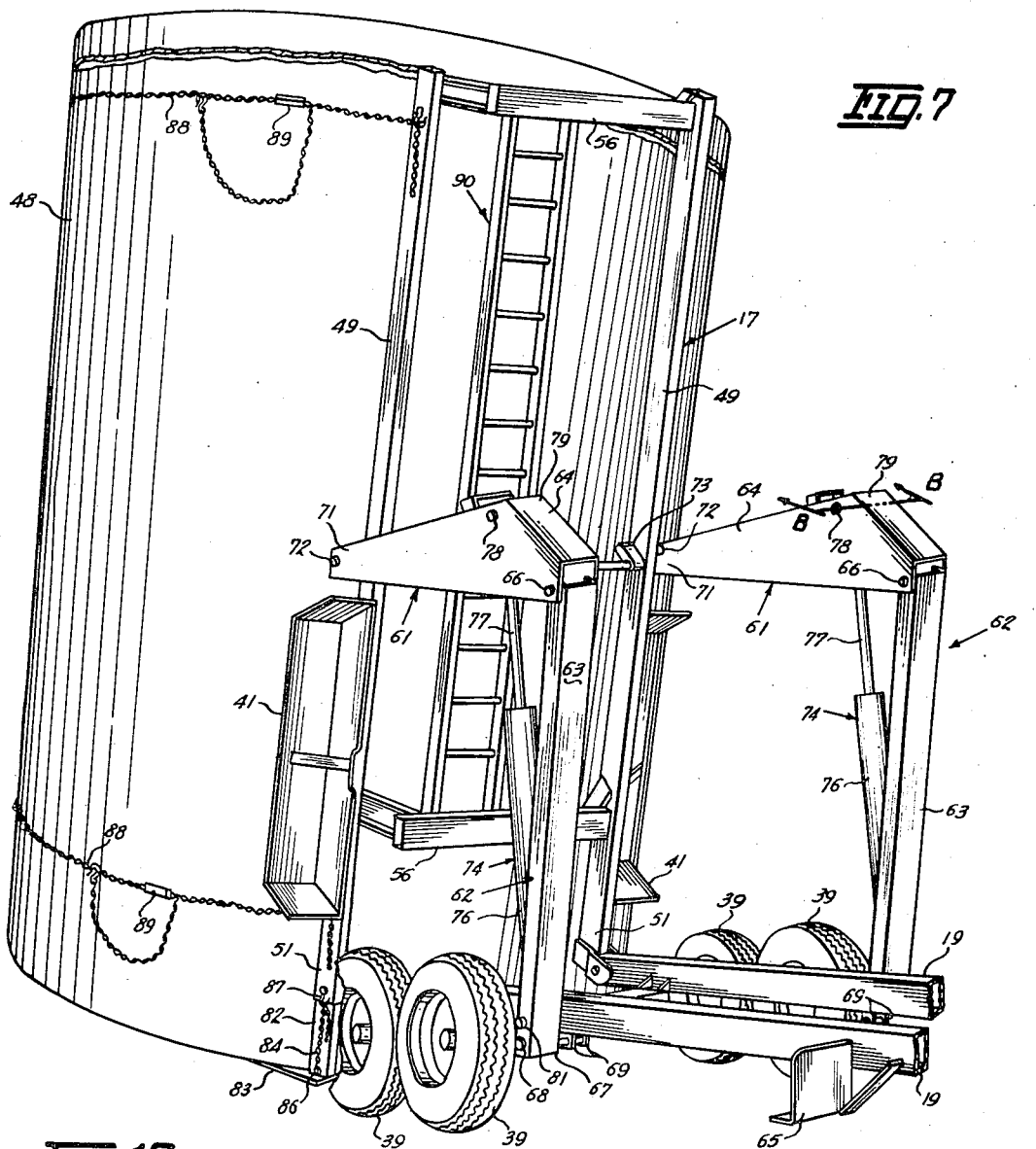
FIG. 7 is an enlarged perspective view of the rear portion of the trailer showing the tank-carrying frame in the upright tank erecting position therefor.

With reference to the drawings, the trailer of this invention, indicated generally as 15 in FIG. 1, is illustrated as including as elongated main frame 16 and a pivoted tank-carrying frame 17. The frame 16 (FIGS. 1 and 3) comprises a pair of transversely spaced side beam structures 18, each of which is comprised of an upright rectangularly shaped tubular member 19 and a corresponding upright channel beam 21, secured as by weldments to the upper surface of about the front half section of a beam 19. As best appears in FIG. 4, the terminal ends 22 of the side legs of a channel beam 21 have the outer faces thereof in the plane of the inner surface 23 of a corresponding tubular beam member 19. In one embodiment of the invention, the tubular beam members 19 are about 32 feet long and the channel beam members are about 16 feet long with both of the beam members 19 and 21 having a vertical dimension of about 8 inches. Each beam structure 18 thus includes a front section defined by the length thereof which includes a channel beam 21 and a rear section of reduced vertical height that is defined by the length of the tubular beam 19 located rearwardly of a channel beam 21.

The tubular beams 19 are connected together by a plurality of longitudinally spaced transverse beam members 24 (FIGS. 3 and 4). The front ends of the beams structures 18 (FIG. 1 and 2) terminate in gooseneck extensions 26, the horizontal head portions 27 of which are connected together by a pair of vertically spaced plate members the upper one 28 of which forms an operator's deck or station. Attached to the underside of the lower plate member 29 is a draft member 31 connectible with a fifth wheel mechanism 32 that is mounted on a usual type tractor vehicle 33. A pair of lift jacks 35 arranged at opposite sides of the main frame 16 are secured to corresponding beam structures 18 adjacent the front ends thereof. The lift jacks are utilized in a usual manner to effect connection and disconnection of the draft member 31 with the fifth wheel mechanism 32.

The rear end of the trailer frame 16 (FIG. 3) is supported on a pair of identical wheel assemblies 34 arranged in tandem. Each wheel assembly includes a housing member 36 provided with a torsion bar or shaft 37, each end of which carries a crank arm 38 on which a wheel 39 is rotatably supported. The wheels 39 of the wheel assemblies 34 are thus in torsion suspension for yieldable support of the trailer frame. A housing member 36 adjacent each of its ends is secured directly by any suitable means to the under surface of a corresponding tubular beam 19. Fenders 41 for the wheels 39 are mounted on the pivoted frame 17.

Located behind the wheel assemblies 34 and mounted on corresponding ones of the tubular beams 19 is a pair of outrigger units 43 (FIGS. 3 and 5), each of which comprises a double acting hydraulic cylinder assembly having a cylinder 44 and an associated downwardly projected piston rod 46, the lower end of which carries a ground engaging base plate 47. The ground plates 47 are moved downwardly into ground engagement when a tank, shown at 48 in FIGS. 1 and 7 is either being erected or picked up for transport and are in upper ground clearing positions when the tank 48 is in transport, as shown in FIG. 2.

The tank-carrying pivoted frame 17 (FIGS. 1 and 3) includes a pair of tubular side members 49 that are pivotally connected to the tubular beams 19 of the vehicle frame 16 at positions rearwardly of the outrigger units 43. The side members 49 have cross sectional dimensions equal to the cross sectional dimensions of the tubular beams 19 but are only about one-half the length of a tubular beam 19. Additionally, the side members 49 of the pivoted frame 17 are spaced transversely apart a distance equal to the transverse spacing of the tubular beams 19 and are arranged in the vertical planes of the tubular members.

As shown in FIG. 5, what will be referred to as the connected ends 51 of the side members 49 are pivotally supported on an associated tubular beam 19 by means including a pair of plates 52 welded to the opposite sides of a side member 49 and projected outwardly therefrom so as to straddle an associated tubular beam 19. A tubular beam 19 (FIG. 6) is provided with a transversely extended sleeve bearing 53 for rotatably receiving a pivot pin 54 the ends of which project laterally outwardly of a tubular beam 19 and through the plates 52, to which they are secured as by weldments.

The side members 49 are connected together for concurrent pivotal movement by longitudinally spaced transverse brace member 56 (FIGS. 5 and 7) that project forwardly of the side members 49, when the pivoted frame 17 is in an upright position to provide for a curved side wall portion of a tank 48 being received between the side members 49 in contact engagement with the corner edges thereof indicated at 57 in FIG. 5.

It is thus seen that the pivoted frame 17 is pivotally movable to an upright position, shown in FIGS. 7 and 9, wherein the side members 49 are located rearwardly of the rear end faces of the tubular beams 19, and to a horizontal forwardly extended transport position (FIG. 2) wherein the side members are vertically above and in resting engagement on the rear sections of the tubular beams 19. In the transport position of the pivoted tank-carrying frame 17, the side members 49 are in longitudinal alignment with the channel beams 21 with their free ends 58 adjacent to the rear ends of the channel beams. The corner edges 57 (FIG. 5) of the side members 49 and the upper inner edges 59 (FIG. 4) of the channel beams 21 are thus in linear alignment over the full length of the beam structures 18. The tank 48 is thus cradled between the structures 18 for resting engagement thereon over the full length of the tank.

For pivotally moving the tank-carrying frame 17 to its tank erecting and transport positions there is provided a pair of like hoist structures 61 (FIG. 7), corresponding to associated pairs of tubular beams 19 and side members 49. Each hoist structure 61 includes a pivoted link system 62 for pivotally interconnecting a tubular beam with a corresponding side member. A link system comprises what will be referred to as a guide link 63 and a lift link 64 having adjacent inner ends pivotally connected together at 66. A guide link 63 is of a channel shape the outer end 67 of which is pivotally supported on a shaft 68 extended transversely of the trailer frame 16 and mounted in brackets 69 which are connected to and depend downwardly from the underside of the tubular beams 19.

The outer end 71 of a lift link 64 is pivotally connected to a side member 49 by means of a stub shaft 72 which projects transversely through an associated side member 49. Located between the side members 49 is a crank or member 73 for connecting together the stub shafts 72. The crank member 73 projects in the direction of the brace members 56 so as to be in a clearance relation with a tank 48 carried on the pivoted frame 17.

Figure 8:
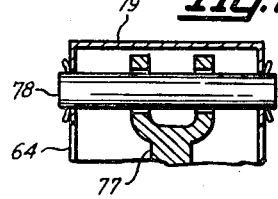
FIG. 8 is an enlarged sectional detail view as seen on the line 8 — 8 in FIG. 7.

To actuate each of the link systems 62 to folded and unfolded positions therefor corresponding to the transport and tank erecting positions, respectively, of the pivoted frame 17 each hoist structure 61 has a linearly extendible and retractable power unit 74, illustrated as a double acting hydraulic cylinder assembly having a cylinder 76 and associated piston rod 77. The guide links 63 and lift links 64 are of channel shapes in transverse cross section with a lift link 64 additionally being of a triangular shape in side elevation. The free end of the piston rod 77 (FIG. 8) is extended between the side legs of a lift link 64 for pivotal connection therewith by a pin 78 at a position adjacent the apex portion 79 of the lift link 64. The closed end of the cylinder 76 is located within a guide link 63 for pivotal connection at 81 with the side legs thereof at a position adjacent to but spaced upwardly from the pivot shaft 68.

When the tank-carrying frame 17 is in its upright position, as shown in FIG. 7, the guide links 63 are extended substantially vertically upwardly from the tubular beams 19 with the lift links 64 horizontally extended between the side members 19 and the guide links 63. With the pivoted frame 17 in its transport position, as illustrated in FIGS. 2 and 3, the hydraulic and assemblies 74 are retracted and housed substantially between the legs of corresponding guide links 63 which extend substantially horizontally along side of an adjacent beam structure 18. In this respect it will be noted that the side legs of a lift link 64 are located outwardly from the side legs of a corresponding guide link 63 to provide for the folding together of associated links 63 and 64. As shown in FIG. 2, the transport position of each hoist structure is defined by the engagement of the inner end of a lift link 64 with a corresponding stop plate 65 (FIG. 7) mounted to the outside of an adjacent beam structure 18.

In order to pick up a tank 48 standing in an upright position on the ground surface, the connected end 51 of each side member 49 of the pivoted frame 17 (FIGS. 7 and 9) is provided with an adjustable leg extension 82 the outer end of which carries a flat foot member 83. A leg extension 82 is comprised of a tubular body member received in a telescopic relation within the connected end 51 of a corresponding side member 49 for extension and retraction to an adjusted position. An adjusted position is maintained by a chain 84, one end of which is attached at 86 to the foot member 83 and the opposite end of which is adjustably connected to a hook 87 secured to a side member 49.

To pick up a tank 48, the pivoted frame 17 is initially moved to its upright position of FIG. 7. The chains 84 are then disconnected from the hooks 87 to permit downward extension of the legs 82 until the foot portions 83 thereon are resting on the ground surface. The chains 84 are then connected to the hooks 87 to prevent further extension of the legs 82 from the side members 49. With the pivoted frame 17 adjacent the tank 48 the trailer 15 is moved rearwardly toward the tank to insert the feet 83 underneath the tank so that the tank is in resting support on the feet and closely adjacent to the side members 49.

With the tank in a supported position on the feet portions 83, holding chains 88, illustrated as two in number spaced longitudinally of the tank 48, are manipulated to secure the tank firmly against the side members 49. A chain 88 has the opposite ends thereof attachable to the side members 49 and is equipped intermediate its ends with a well-known type chain tightening and locking device 89 which functions to tighten the chain 88 to pull the tank 48 into an engaged position with the corner edges 57 of the side members 49. To facilitate handling of the chains 88 the pivoted frame 17 is equipped with a ladder 90.

With the outrigger units 43 extended into ground engagement to stabilize the trailer 15 against lateral tilting movement the hoist structures 61 are operated to move the tank 48 from an upright position shown in FIG. 7, to its transport position shown in FIG. 2. In the transport position the tank 48 is secured directly to the beam structures 18 by chains 85 extended about the upper portion of the tank and attached to hooks 95 carried on the beam structures. In erecting the tank 48 at a storage station, the above procedure is reversed.

Where a pair of small tanks about half the length of a tank 48 are to be handled the above procedure for the handling of a single large tank 48 is followed including movement of the pivoted frame 17 to its transport position. At this point in the operation the first small tank being handled is released from the pivoted frame 17 by removal of the chains 88 and moved forwardly to a supported position only on the inner upper edges 59 of the channel beams 21. This first small tank is then secured to the beam structures 18 by the chains 85. The pivoted frame 17 is then operated in the manner above described for the large tank 48 to pick up the second small tank, which in transport remains secured to the pivoted frame by the chains 88.

In the event a tank should be removed from or erected upon an irregular ground surface the lift jacks 35 and the outrigger units 43 may be relatively operated to position the pivoted frame 17, when in an upright position, in a substantially parallel relation with the axis of the tank being handled.

Figure 10:
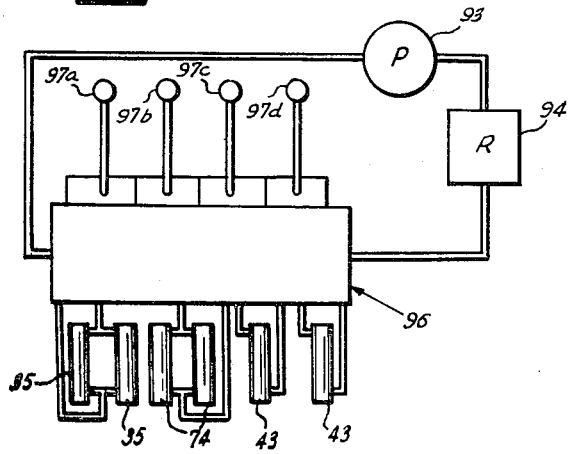
FIG. 10 is a diagrammatic showing of a hydraulic control system for the trailer.

For operating the lift jacks 35, outrigger units 43 and hydraulic cylinder assemblies 74, the operator's platform 28 (FIGS. 1 and 3) is equipped with a power unit 91, illustrated as an internal combustion engine of air cooled type, for driving a hydraulic pump unit 92 which includes a pump 93 (FIG. 10) and a reservoir 94 that form part of a hydraulic control system. A multi-valve control unit 96, of a commercially available type, is operatively connected with the pump and reservoir to provide for a selective manual actuation of control levers 97a –97d, inclusive. As shown, the levers 97a and 97b correspond to the lift cylinders 35 and hoist cylinders 74, respectively; and each lever 97c and 97d independently control the operation of an outrigger cylinder 43.

As is well-known each control lever may be operated independently of or jointly with the other control levers for reversed movement from a center neutral position therefor to provide for a reciprocal operation of the hydraulic cylinders corresponding thereto. By virtue of the location of the control station on the head portions 27 of the gooseneck extensions 26, the operation of the trailer 15 is directly visible to the trailer operator so as to facilitate the overall operation for handling tanks.

Although the invention has been described with respect to a preferred embodiment thereof, it is to be understood that it is not to be so limited since changes and modification can be made therein which are within the full intended scope of this invention as defined by the appended claims.

We claim:

1. A trailer for handling storage tanks for transport and erection comprising:
   a. a main frame,
   b. a pivoted frame,
   c. means pivotally connecting one end of said pivoted frame on said main frame for movement of the pivoted frame to the first upright tank-erecting position located rearwardly of said main frame and to a second horizontally extended tank transport position in resting engagement on said main frame,
   d. support means on said pivoted frame adjustable longitudinally thereof toward and away from said one end to an adjusted position such that when the pivoted frame is in said upright position said support means, on a rearward travel of said trailer, is movable into engagement with the bottom end of a tank to be transported,
   e. means for securing a tank resting on said support means to said pivoted frame, and
   f. means including a pivoted linkage system pivotally interconnected to said two frames for moving the pivoted frame with a tank secured thereto to said second position therefor.

2. The tank handling trailer according to claim 1, wherein:
   a. said main frame includes a pair of transversely spaced beam structures,
   b. a pair of power operated jack units corresponding to and mounted on said beam structures adjacent the front ends thereof,
   c. a pair of power operated outrigger units corresponding to and mounted on said beam structures adjacent the rear ends thereof,
   d. said interconnected means including a power operated linearly extendible and retractible means,
   e. power means on said main frame, and
   f. manually actuated control means on said main frame operatively associated with said power means to selectively control the operation of said jack units, outrigger units and linearly extendible and retractible means.

3. The storage tank handling trailer according to claim 1, wherein:
   a. said support means includes a pair of transversely spaced leg extensions on said pivoted frame adjustable longitudinally thereof outwardly and inwardly relative to said one end, and
   b. a foot portion on each leg portion engageable with the underside of a tank.

4. The storage tank handling trailer according to claim 3, wherein:
   a. said securing means includes coacting engaging portions on the tank and on said pivoted frame, and
   b. an adjustable elongated flexible means extendible about a peripheral portion of the tank with the ends thereof connectible to transversely opposite side portions of said pivoted frame.

5. The tank handling trailer according to claim 1, wherein:
   a. said main frame includes a pair of transversely spaced upright beam structures each of which has a front section and a rear section,
   b. said rear sections being of a reduced height relative to said front sections, and
   c. said pivoted frame having a pair of side members each of which is of a width corresponding to the vertical distance between the upper surfaces of a front section and a rear section, and of a length slightly less than the length of a rear section, said side members spaced apart a distance corresponding to the transverse spacing of said beam structures, whereby said side members, in the second position of said pivoted frame, overly only corresponding ones of said rear sections with the top surfaces thereof lying in a plane common to the upper surfaces of said front sections.

6. The tank handling trailer according to claim 5, wherein:
   a. each side member is of a length equal substantially to one-half the length of a beam structure.

* * * * *